United States Patent [19]
Phillips et al.

[11] 4,227,769
[45] Oct. 14, 1980

[54] PLANAR OPTICAL WAVEGUIDE COMPRISING THIN METAL OXIDE FILM INCORPORATING A RELIEF PHASE GRATING

[75] Inventors: William Phillips, Princeton, N.J.; Clyde C. Neil, Levittown, Pa.; Jacob M. Hammer, Plainsboro, N.J.

[73] Assignee: RCA Corporation, New York, N.Y.

[21] Appl. No.: 927,513

[22] Filed: Jul. 24, 1978

[51] Int. Cl.³ .............................................. G02B 5/14
[52] U.S. Cl. .............................. 350/96.19; 350/162 R
[58] Field of Search ....................... 350/96.19, 162 R

[56] References Cited
U.S. PATENT DOCUMENTS

| | | | |
|---|---|---|---|
| 3,912,363 | 10/1975 | Hammer | 350/96.19 |
| 3,982,810 | 9/1976 | Tamir et al. | 350/96.19 |
| 4,082,425 | 4/1978 | Miller | 350/96.19 |
| 4,102,560 | 7/1978 | Miller | 350/96.19 |
| 4,156,206 | 5/1979 | Comerford et al. | 350/96.19 |

Primary Examiner—Stewart J. Levy
Attorney, Agent, or Firm—Samuel Cohen; George J. Seligsohn

[57] ABSTRACT

Enhanced optical coupling by phase evanescent fields is achieved by covering the planar layer of a waveguide with a thin metal oxide film incorporating a relief phase grating. The grating is originally formed in a metallic film covering the planar layer, which metallic film is converted to a metal oxide film by heating in an oxygen-containing atmosphere.

6 Claims, 4 Drawing Figures

PLANAR OPTICAL WAVEGUIDE

PLANAR OPTICAL WAVEGUIDE COMPRISING THIN METAL OXIDE FILM INCORPORATING A RELIEF PHASE GRATING

This invention relates to planar optical waveguides and, more particularly, to such waveguides which incorporate an optical-coupling relief phase grating on the surface thereof.

Reference is made to U.S. Pat. No. 3,912,363, which issued Oct. 14, 1975. This patent is directed to an optical coupler for coupling light wave energy between a fiber optic and a planar optical waveguide by phase-matched evanescent fields. A planar optical waveguide comprises a substrate, composed of a relatively low-index-of-refraction dielectric material, supporting a planar layer, composed of a relatively high index-of-refraction dielectric material. Proper phase matching of the evanescent fields is enhanced by the use of a relief phase grating situated at the surface of the planar layer of the waveguide and located in proximity to the coupling end of the fiber optic. As disclosed in U.S. Pat. No. 3,912,363, the grating may be a holographically recorded photoresist grating; a grating produced in the planar layer by ion or electron beam milling, or alternatively, a holographic interference pattern within a light-sensitive plastic in which the fiber-optic and a portion of the planar layer are included.

The present invention is directed to an improved planar optical waveguide comprising a metal oxide film which is supported by the planar layer of the waveguide. This metal oxide film, which exhibits an index of refraction greater than that of the planar-layer dielectric material, incorporates an optical-coupling relief phase grating on the surface thereof. The present invention is further directed to a method for forming such a metal oxide film incorporating such a grating on the planar layer of a planar optical waveguide.

Figure 1:
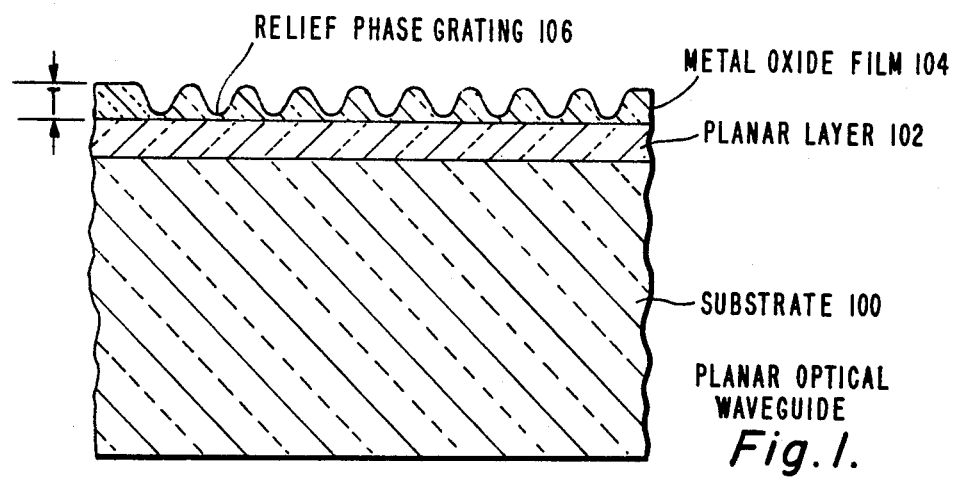
FIG. 1 is a diagram of a planar optical waveguide embodying the present invention.

Referring now to FIG. 1, there is shown a planar optical waveguide comprising substrate 100 supporting planar layer 102, which, in turn, supports metal-oxide film 104. Substrate 100 is made of a first dielectric material, such as $LiTaO_3$, exhibiting a relatively low index of refraction. Planar layer 102 is made of a second dielectric material, such as $(LiNbO_3) \times (LiTaO_3)_{1-x}$, exhibiting a higher index of refraction than that of the first dielectric material of which substrate 100 is composed. For the purposes of the present invention, the value of x is not critical. Metal-oxide film 104, which may comprise niobium oxide, exhibits an index of refraction slightly higher than that of the second dielectric material of which planar layer 102 is composed. Metal-oxide film 104 preferably has a thickness T in the range of 120–250 nanometers. However, although not preferable, the thickness T of the metal oxide film 104 may extend all the way down to 60 nanometers or all the way up to 500 nanometers. In any case, metal oxide film 104 is very thin. Metal oxide film 104 incorporates an optical-coupling relief phase grating 106 having a typical periodicity of about 300 nanometers.

Figure 2:
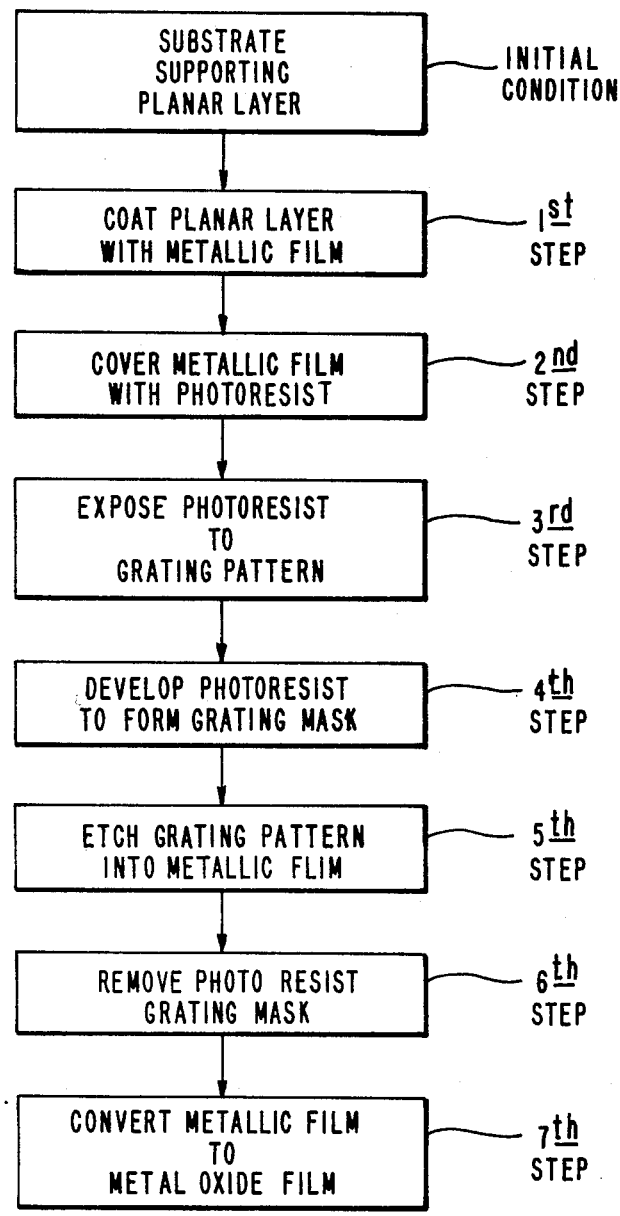
FIG. 2 is a flow sheet illustrating a method of forming a metal oxide film incorporating a relief phase grating on the surface of the planar layer of the planar optical waveguide of FIG. 1.

The thin metal-oxide film 104, incorporating relief phase grating 106, may be formed on planar layer 102 by the steps of the method shown in FIG. 2. Initially, planar optical waveguide incorporates only substrate 100 supporting layer 102. The first step is to coat the surface of planar layer 102 with a metallic film, such as a film of metallic niobium. The thickness of this film may be anywhere in the range of between 20–200 nanometers, but is preferably within the smaller range of 40–100 nanometers. The coating of planar layer 102 with this metallic film may be accomplished by such means as evaporation, for example.

The second step is to cover the metallic film with photoresist, followed by the third step of exposing the photoresist to a grating pattern. The grating pattern may be produced holographically by interfering two angularly-displaced beams of coherent light. The development of the photoresist, in accordance with the fourth step, results in a photoresist grating mask being formed on the surface of the metal film. The grating pattern is produced in the metallic film, in accordance with the fifth step, by etching the metal exposed to the mask by such means as acid etching, sputter etching, ion milling etc. In accordance with the sixth step, the photoresist forming the grating mask is entirely removed, leaving the surface of planar layer 102 covered with a metallic film, which is much thinner than the desired metal oxide film, but which incorporates a relief phase grating. In accordance with the seventh step, the metallic film is converted to the desired metal oxide film. This is accomplished by annealing the metal film in an oxygen-containing atmosphere at an appropriately high given temperature for a sufficient time for the metal to be oxidized into the metal oxide. When the metal film is niobium, annealing in an oxygen-containing atmosphere for typically one hour at 500° C. converts the niobium to niobium oxide. At the same time, the thickness of the film, in being converted from a metallic state to a metal oxide state, increases about 2½ to 3 times.

A planar optical waveguide comprising a metal oxide film incorporating an optical type coupling relief phase grating, of the type shown in FIG. 1 and formed by the method of FIG. 2, is particularly effective at providing strong optical coupling by phase-matched evanescent fields because, inter alia, the high index of refraction of the thin metal oxide film increases the field strength in the coupling region.

Figure 3:
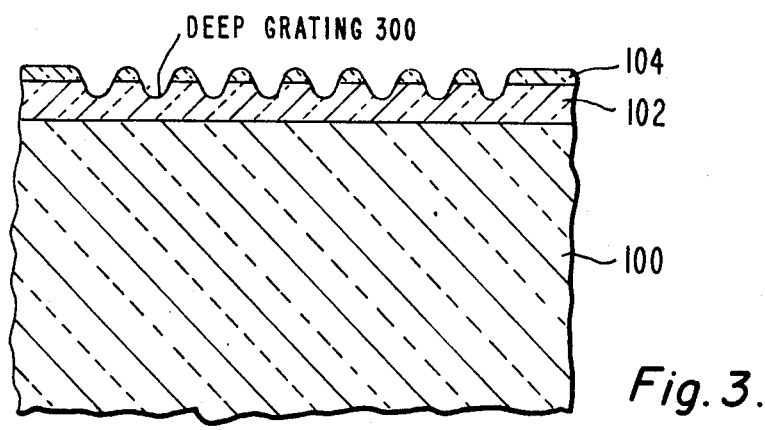
FIG. 3 illustrates a first modification of the planar waveguide of FIG. 1.
Figure 4:
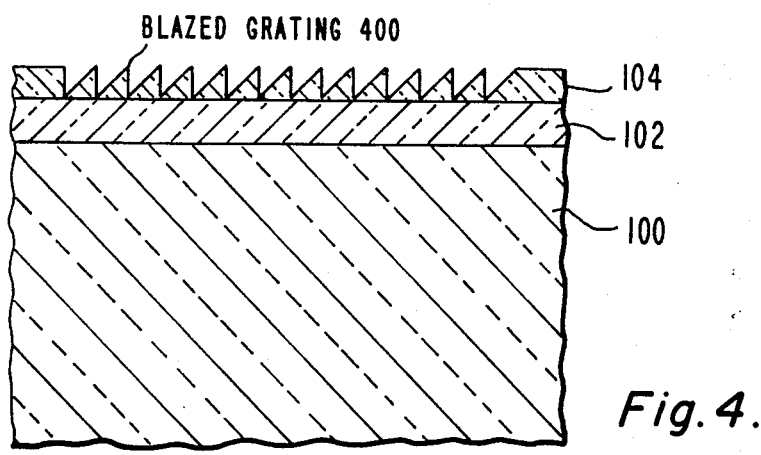
FIG. 4 illustrates a second modification of the planar optical waveguide of FIG. 1.

For certain types of optical coupling, modification of the relief phase grating 106 may be required. For instance when it is desired to provide multimode coupling of higher dielectric waveguide modes, deep gratings, such as deep grating 300 of FIG. 3, are needed. As indicated for deep grating 300, the respective bottoms of the grating extend beyond metal oxide film 104 well into planar layer 102. The relief phase grating 106 of FIG. 1 may be modified to form deep grating 300 of FIG. 3 by appropriate ion milling. In a similar manner, ion milling may be employed to convert relief grating 106 of FIG. 1 into blazed grating 400 of FIG. 4, where it is desired to employ a blazed grating to increase coupling efficiency.

Although for illustrative purposes, the metallic film described herein is composed of niobium and the metal oxide film is niobium oxide, it should be understood that other appropriate metals, that provide metal oxide films of relatively high index of refraction, and high optical quality may be employed instead of niobium. For instance, the metallic film could also be composed of tantalum.

What is claimed is:

1. A planar optical waveguide comprising:
   a substrate composed of a first dielectric material exhibiting a first index of refraction,
   a planar layer composed of a second dielectric material exhibiting a second index of refraction greater than said first index of refraction said substrate supporting said planar layer,
   a metal oxide film coating said planar layer, said metal oxide film exhibiting a third index of refraction greater than said second index of refraction, and
   an optical-coupling relief phase grating incorporated on the exposed surface of said metal oxide film.

2. The waveguide defined in claim 1, wherein said first dielectric material is $LiTaO_3$, said second dielectric material is $(LiNbO_3)\times(LiTaO_3)_{1-x}$, and said metal oxide is niobium oxide.

3. The waveguide defined in claim 2, wherein said film has a thickness in the range of 60–500 nanometers.

4. The waveguide defined in claim 3, wherein said film has a thickness in the range of 120–250 nanometers.

5. The waveguide defined in claim 1, wherein said relief phase grating extends into said planar layer.

6. The waveguide defined in claim 1, wherein said relief phase grating is a blazed grating.

* * * * *